United States Patent
Mason et al.

(10) Patent No.: US 10,785,850 B2
(45) Date of Patent: Sep. 22, 2020

(54) CONTROLLER FOR INDICATING A PRESENCE OF A VIRTUAL OBJECT VIA A LIGHTING DEVICE AND A METHOD THEREOF

(71) Applicant: SIGNIFY HOLDING B.V., Eindhoven (NL)

(72) Inventors: Jonathan David Mason, Waalre (NL); Jochen Renaat Van Gheluwe, Lommel (BE); Dzmitry Viktorovich Aliakseyeu, Eindhoven (NL); Dirk Valentinus René Engelen, Heusden-Zolder (BE); Sanae Chraibi, Eindhoven (NL); Berent Willem Meerbeek, Veldhoven (NL); Bartel Marinus Van De Sluis, Eindhoven (NL); Anthonie Hendrik Bergman, Neunen (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/486,173

(22) PCT Filed: Feb. 5, 2018

(86) PCT No.: PCT/EP2018/052810
§ 371 (c)(1),
(2) Date: Aug. 15, 2019

(87) PCT Pub. No.: WO2018/149681
PCT Pub. Date: Aug. 23, 2018

(65) Prior Publication Data
US 2020/0060006 A1    Feb. 20, 2020

(30) Foreign Application Priority Data

Feb. 16, 2017 (EP) .................................... 17156401

(51) Int. Cl.
*H05B 47/105* (2020.01)

(52) U.S. Cl.
CPC .................................... *H05B 47/105* (2020.01)

(58) Field of Classification Search
None
See application file for complete search history.

(56) References Cited

U.S. PATENT DOCUMENTS

| 8,659,624 B2 | 2/2014 | Matsui |
| 8,941,654 B2 | 1/2015 | Geraci et al. |
| (Continued) | | |

FOREIGN PATENT DOCUMENTS

| WO | 2016055648 A1 | 4/2016 |
| WO | 2018073043 A1 | 4/2018 |

OTHER PUBLICATIONS

US 4,992,701 A, 02/1991, Sacchetti (withdrawn)
(Continued)

*Primary Examiner* — Jany Richardson
(74) *Attorney, Agent, or Firm* — Meenakshy Chakravorty (57) ABSTRACT

A controller (102) and a method for indicating a presence of a virtual object (110) via a lighting device (108) are disclosed. The virtual object (110) has a virtual location corresponding to a physical location. The controller (102) comprises a receiver (104) configured to receive location information representative of the physical location of the virtual object (110) relative to the lighting device (108). The controller further comprises a processor (106) configured to determine if the virtual object (110) is located within a first predetermined proximity (112) of the lighting device (108) based on the location information, and to control the lighting device (108) according to a light setting when the virtual object (110) is located within the first predetermined proximity (112) of the lighting device (108).

14 Claims, 4 Drawing Sheets

(56) References Cited

U.S. PATENT DOCUMENTS

| | | |
|---|---|---|
| 9,226,106 B1 | 12/2015 | Kornmann et al. |
| 2005/0168465 A1 | 8/2005 | Tatsumi |
| 2013/0084970 A1 | 4/2013 | Geisner et al. |
| 2014/0132628 A1 | 5/2014 | Hoff, III |
| 2015/0282282 A1 | 10/2015 | Breuer et al. |
| 2016/0166927 A1 | 6/2016 | Leyland et al. |
| 2016/0184703 A1 | 6/2016 | Brav et al. |
| 2018/0124148 A1* | 5/2018 | Boudville .............. H04L 67/02 |

OTHER PUBLICATIONS

Frank, Allegra, "Pokémon Go Plus: Everything you need to know (update)", Sep. 16, 2016, https://www.polygon.com/2016/7/11/12153040/pokennon-go-plus-price-info-and-release-date (6 pages) (Year: 2016).*

Allegra Frank, "Pokémon Go Plus: Everything You Need to Know," http://www.polygon.com/2016/7/11/12153040/pokemon-go-plus-price-info-and-release-date, 2016 (7 pages).

Dean Takahashi, "How Pokémon Go Will Benefit From Niantic's Lessons From Ingress on Location-Based Game Design," https://venturebeat.com/2015/12/16/how-niantic-will-marry-animate . . . 2015 (7 Pages).

* cited by examiner

CONTROLLER FOR INDICATING A PRESENCE OF A VIRTUAL OBJECT VIA A LIGHTING DEVICE AND A METHOD THEREOF

CROSS-REFERENCE TO PRIOR APPLICATIONS

This application is the U.S. National Phase application under 35 U.S.C. § 371 of International Application No. PCT/EP2018/052810, filed on Feb. 5, 2018, which claims the benefit of European Patent Application No. 17156401.6, filed on Feb. 16, 2017. These applications are hereby incorporated by reference herein.

FIELD OF THE INVENTION

The invention relates to a controller for indicating a presence of a virtual object via a lighting device. The invention further relates to a system for indicating a presence of a virtual object via a lighting device. The invention further relates to a method for indicating a presence of a virtual object via a lighting device and to a computer program product for executing the method.

BACKGROUND

Recent developments in virtual reality (VR) and augmented reality (AR) enable a user to interact with virtual objects. These virtual objects may be displayed as an overlay on top of the physical world, for example on a smartphone or on AR-goggles. This technology enables many different types of applications, for example position-based treasure hunt games. When playing such a game, a user may move through the physical world in order to 'hunt' (seek) virtual treasures. For some of these games, or other applications, there is a need to indicate to a user where virtual objects are located.

SUMMARY OF THE INVENTION

It is an object of the present invention to indicate to a user where a virtual object is located.

According to a first aspect of the present invention, the object is achieved by a controller for indicating a presence of a virtual object via a lighting device, the virtual object having a virtual location corresponding to a physical location, the controller comprising:

a receiver configured to receive location information representative of the physical location of the virtual object relative to the lighting device, a processor configured to determine if the virtual object is located within a first predetermined proximity of the lighting device based on the location information, and to control the lighting device according to a light setting when the virtual object is located within the first predetermined proximity of the lighting device.

The virtual object, for example a virtual character, has a virtual location that corresponds to a physical location (e.g. a set of coordinates corresponding to a physical location). The controller controls the lighting device according to the light setting when the virtual object is located within the first predetermined proximity (e.g. an area which may be defined by sets of coordinates) of the lighting device. The controller may change the light output of the lighting device according to the light setting when the virtual object is located within the first predetermined proximity of the lighting device. By changing the light output of the lighting device to the light setting, a user is notified that the virtual object is located nearby (i.e. within the first predetermined proximity) the lighting device. This is beneficial, because a user can see from a distance whether or not the virtual object is located nearby the lighting device. The light setting may be a predefined light setting (e.g. a red light setting, or a dynamic light setting that changes color over time), such that a user can easily recognize the predefined light setting, resulting in that the user can easily see whether or not the virtual object is located nearby the lighting device.

In embodiments, the receiver is further configured to receive a presence signal from a portable device, and the processor is configured to determine that the portable device is located within a second predetermined proximity of the lighting device based on the presence signal, and to control the lighting device according to the light setting when the portable device is located within the second predetermined proximity of the lighting device. By controlling the lighting device according to the light setting only when the portable device (and therewith the user) is located within the second predetermined proximity of the lighting device, the light output of the lighting device is not changed when the user is not located nearby the lighting device. This is beneficial for other users who need the light output of the lighting device for other purposes.

In embodiments, the processor is further configured to control a direction of a beam of light of the lighting device, and to direct the beam of light towards the physical location of the virtual object. This is advantageous, because it enables a user to see the exact location of the virtual object relative to the lighting device.

In embodiments, controller is further configured to embed a code in a light output of the lighting device, wherein the code comprises a message representative of that the virtual object is located within the first predetermined proximity of the lighting device. The light setting may be a coded light setting comprising the message. The code embedded in the light output may be detectable by a light sensor (e.g. a camera or a photodiode) of the portable device. This enables a user to point the light sensor of the portable device (e.g. a smartphone, smart glasses, etc.) towards the lighting device, whereupon the portable device may provide an indicator (e.g. on a display) to the user that the virtual object is located within the first predetermined proximity of the lighting device. The code may be unperceivable for a user. This is beneficial for other users who use the light output for other purposes.

In embodiments, the processor is configured to determine a distance between the virtual object and the lighting device based on the location information. The processor may be configured to determine the light setting based on the distance between the virtual object and the lighting device. The light setting may, for example, be indicative of a distance between the virtual object and the lighting device (e.g. red light when the virtual object is farther away from the lighting device and green light if the virtual object is closer by the lighting device). Additionally or alternatively, the processor may be configured to determine a distance between the portable device and the lighting device. The processor may be configured to determine the light setting based on the distance between the portable device and the lighting device and based on the distance between the virtual object and the lighting device.

In embodiments, the receiver is configured to receive location information representative of a plurality of physical locations of a plurality of virtual objects relative to the lighting device, and the processor is configured to determine the light setting based on a number of virtual objects that are within the first predetermined proximity of the lighting device. This is beneficial, because it enables a user to see how many virtual objects are located within the first predetermined proximity of the lighting device.

In embodiments, the processor is further configured to determine the light setting based on a property of the virtual object. The property may, for example, be a color of the virtual object, and the processor may be configured to control the lighting device according to a light setting having a color (and/or brightness) that corresponds to the color of the virtual object. Additionally or alternatively, the property may be a type of the virtual object, and the processor may be configured to control the lighting device according to a light setting having a color (and/or brightness) that corresponds to the type of the virtual object. Additionally or alternatively, the property may be an orientation of the virtual object, and the processor may be configured to control the lighting device according to a light setting having a brightness (and/or a color) that corresponds to the orientation of the virtual object (, for example if the virtual object is moving towards/facing the lighting device, the brightness (and/or color) may be different then when the virtual object is moving away from the lighting device). Additionally or alternatively, the property may be a remaining lifetime of the virtual object, and the processor may be configured to control the lighting device according to a light setting having a brightness (and/or a color) that corresponds to the remaining lifetime (e.g. how long the virtual object will be present within the first predetermined proximity of the lighting device) of the virtual object. Additionally or alternatively, the property may be a state of the virtual object, and the processor may be configured to control the lighting device according to a light setting having a color and/or brightness that corresponds to the state of the virtual object (e.g. presence of virtual object which allows user interactivity may be indicated with a light setting different from presence of a virtual object that does not user interactivity).

In embodiments, the virtual object moves between multiple virtual locations corresponding to physical locations. The controller may be continuously updated on the location of the virtual object. The receiver may receive the location information at specific moments in time. Additionally or alternatively, the location information may comprise information about a trajectory of the virtual object over time relative to the lighting device. This is beneficial, because it enables the processor to determine the location of a moving virtual object.

In embodiments, the controller is comprised in the lighting device, and the receiver comprises a network module configured to access the location information via a network. The network may provide access to a central server configured to store the (current) location(s) of one or more virtual objects. Additionally, the network module may be configured to receive the presence signal from the portable device (directly or indirectly), which enables the processor to determine that the portable device is located within the second predetermined proximity of the lighting device based on the presence signal.

Alternatively, the controller is located remote from the lighting device, and the controller comprises a network module configured to transmit lighting control commands to the lighting device to control the lighting device according to the light setting. The network module may be further configured to access the location information via a network. The network module may be further configured to receive location information about the lighting device, such that the processor is able to determine if the virtual object is located within a first predetermined proximity of the lighting device. The network module may be further configured to receive the presence signal from the portable device (directly or indirectly).

Alternatively, the controller is comprised in the portable device, and the controller comprises a network module configured to transmit lighting control commands to the lighting device to control the lighting device according to the light setting. The network module may be further configured to receive location information about the lighting device, such that the processor is able to determine if the virtual object is located within a first predetermined proximity of the lighting device.

In embodiments, the processor may be further configured to obtain location information about the physical location of the lighting device, and to determine the light setting based on a relation between the physical location of the lighting device and the physical location of the virtual object. For instance, the virtual object may be a virtual character that moves in the virtual space, and therewith in the physical space. The processor may control the lighting device when the virtual character is located at (or 'underneath') the lighting device.

Additionally, the presence signal may comprise location information about the physical location of the portable device, and the processor may be further configured to determine the light setting based on a relation between the physical location of the lighting device, the physical location of the portable device and the physical location of the virtual object. This enables the processor to further indicate the presence of the virtual object. For instance, when a virtual object 'moves' in between the lighting device and the portable device, the processor may change the light setting of the lighting device to indicate the object's presence. The processor may, for instance, change the color of the light according to the color of the virtual object. Alternatively, the processor may switch off the lighting device to mimic a shadow of the virtual object. In another example, when the virtual object approaches a user facing the lighting device from behind, the processor may gradually increase or decrease the brightness of the light setting to indicate the approaching virtual object.

According to a second aspect of the present invention, the object is achieved by a lighting system for indicating a presence of a virtual object via a lighting device, the system comprising the controller of any one of the above-mentioned controllers and one or more lighting devices configured to receive lighting control commands from the controller.

According to a third aspect of the present invention, the object is achieved by a method of indicating a presence of a virtual object via a lighting device, the virtual object having a virtual location corresponding to a physical location, the method comprising:

receiving location information representative of the physical location of the virtual object relative to the lighting device, determining if the virtual object is located within a first predetermined proximity of the lighting device based on the location information, and controlling the lighting device according to a light setting when the virtual object is located within the first predetermined proximity of the lighting device.

In embodiments of the method, the virtual object moves between multiple virtual locations corresponding to physical locations. A controller may be continuously updated on the location of the virtual object. A receiver may receive the location information at specific moments in time. Additionally or alternatively, the location information may comprise information about a trajectory of the virtual object over time relative to the lighting device. This is beneficial, because it enables the processor to determine the location of a moving virtual object.

It should be understood that the method may have similar and/or identical embodiments and advantages as the claimed controller.

According to a fourth aspect of the present invention, the object is achieved by a computer program product for a computing device, the computer program product comprising computer program code to perform any one of the above-mentioned methods when the computer program product is run on a processing unit of the computing device.

BRIEF DESCRIPTION OF THE DRAWINGS

The above, as well as additional objects, features and advantages of the disclosed controllers, systems and methods will be better understood through the following illustrative and non-limiting detailed description of embodiments of devices and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION OF EMBODIMENTS

Figure 1:
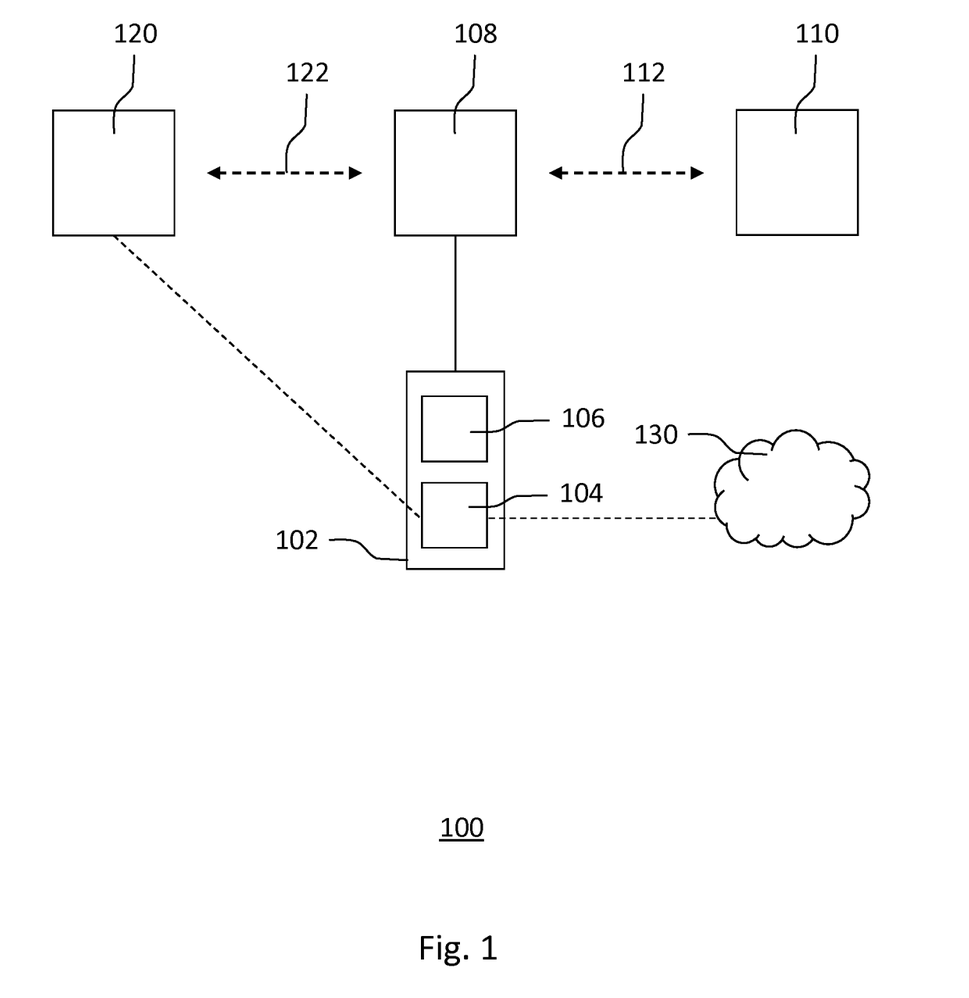
FIG. 1 shows schematically an embodiment of a lighting system according to the invention for indicating a presence of a virtual object via a lighting device.

FIG. 1 shows schematically an embodiment of a lighting system 100 according to the invention for indicating a presence of a virtual object 110 via a lighting device 108. The virtual object 110 has a virtual location corresponding to a physical location. The system 100 further comprises a controller 102. The controller 102 comprises a receiver 104 configured to receive location information representative of the physical location of the virtual object 110 relative to the lighting device 108, and a processor 106 configured to determine that the virtual object 110 is located within a first predetermined proximity 112 of the lighting device 108 based on the location information, and to control the lighting device 108 according to a light setting when the virtual object 110 is located within the first predetermined proximity 112 of the lighting device 108.

The virtual object 110 may be displayed on a user's portable device 120 (e.g. a smartphone, smart glasses, a smart watch, etc.) when the user points his portable device 120 towards the physical location of the virtual object 110. The virtual object 110 may for example be text, a graphic or a video. The virtual object 110 is perceivable for a user when it is displayed on the user's portable device 120. The virtual object 110 may be rendered as an overlay on top of the physical environment using various known augmented reality (AR) (or virtual reality (VR)) techniques. The virtual object 110, for instance a virtual character, may be provided by a computer program running on a (remote) computing device (e.g. a game server, an AR-content server, etc.). The virtual object 110 has a virtual location corresponding to a physical location. The virtual location (and therewith the physical location) may be determined by a computer program running on a (remote) computing device (e.g. a game server, an AR-content server, etc.). The physical location of the virtual object 110 may, for example, be a GPS location (e.g. a set of coordinates), an (indoor) location relative to an area (e.g. coordinates in a room), etc. The physical locations of one or more virtual objects 108 may be stored in a memory accessible by the controller 102. The memory may be comprised in a remote server 130, accessible via a network. Similarly, the lighting device 108 has a physical location. The physical location of the lighting device 108 may, for example, be a GPS location (e.g. a set of coordinates), an (indoor) location relative to an area (e.g. coordinates in a room), etc. The physical locations of one or more lighting devices 108 may also be stored in the memory, in a further memory, in the lighting device 108, etc., accessible by the controller 102.

The receiver 104 is configured to receive location information representative of the physical location of the virtual object 110 relative to the lighting device 108. The receiver 104 may receive the location information from a remote server 130 via a network connection. The receiver 104 may be further configured to receive the location of the lighting device 108, for example via the network connection, from a positioning module of the lighting device 108, via a bridge or router device, etc. The receiver 104 may be arranged for communicating with the lighting device 108 and/or the remote server 130 via any wired or wireless communication protocol. Various wired and wireless communication protocols may be used, examples include but are not limited to Ethernet, DMX, DALI, USB, Bluetooth, Wi-Fi, Li-Fi, 3 G, 4 G and/or ZigBee.

The processor 106 is configured to determine if the virtual object 110 is located within a first predetermined proximity 112 of the lighting device 108 based on the location information. The location information may, for example, comprise a set of coordinates of the physical location of the virtual object 110, and the processor 106 may determine a distance between the lighting device 108 and the virtual object 110 based on the location (e.g. a set of coordinates of the location of the lighting device 108). If the distance is below a predetermined threshold, the processor 106 may determine that the virtual object 110 is located within the first predetermined proximity 112 of the lighting device 108. Alternatively, the location information may be indicative of an area surrounding the lighting device 108, and the processor 106 may determine if the location of the virtual object 110 is located inside the area. If the virtual object 110 is located inside the area, the processor 106 may determine that the virtual object 110 is located within the first predetermined proximity 112 of the lighting device 108.

The first predetermined proximity 112 may be selected based on the intended use of the system 100. The range of the first predetermined proximity 112 may depend on the scale of the system. If, for example, the lighting device 108 is a luminaire which is used in a home lighting system, the first predetermined proximity 112 may be a distance of for example 1, 2 or 5 meters from the lighting device 108, whereas if the lighting device 108 is an outdoor luminaire, such as a street lamp post, the first predetermined proximity 112 may be a distance of for example 2, 5, 10 or 20 meters from the lighting device 108. It should be noted that these distances are mere examples, and that the skilled person would be able to design many alternatives without departing form the scope of the appended claims.

If the virtual object 110 is located within the first predetermined proximity 112 of the lighting device 108, the processor 106 controls the lighting device 108 according to a light setting. The processor 106 may change the light output of the lighting device 108 according to the light setting when the virtual object 110 is located within the first predetermined proximity 112 of the lighting device 108, for example from a current light setting (e.g. on/off) to a different light setting (e.g. switching the light from off to on, changing the color of the light output, blinking the light, embedding a code in the light output, etc.). By changing the light output of the lighting device 108 to the (new) light setting, a user is notified that the virtual object 110 is located nearby (i.e. within the first predetermined proximity 112) the lighting device 108. The light setting may be a predefined light setting (e.g. a blue light setting, or a dynamic light setting that changes color over time), such that a user can easily recognize the predefined light setting, resulting in that the user can easily see whether or not the virtual object 110 is located nearby the lighting device 108.

The processor 106 may be configured to communicate lighting control commands to the lighting device 108 in order to control the lighting device 108 according to the light setting. The lighting control commands may comprise control instructions for controlling the color, brightness and/or saturation of the light emitted by the lighting device 108. In embodiments wherein the controller 102 is located remote from the lighting device 108, the controller 102 may further comprise a transmitter for transmitting the lighting control commands to the lighting device 108. Alternatively, in embodiments wherein the controller 102 is comprised in the lighting device 108, the processor 106 may communicate the lighting control commands to the light sources of the lighting device 108 (e.g. via a driver).

The processor 106 may be further configured to control the lighting device 108 according to a light setting comprising an embedded code. The processor 106 may be configured to control a driver of the lighting device 108 to embed a code in the light output of the lighting device 108, wherein the code comprises a message representative of that the virtual object 110 is located within the first predetermined proximity 112 of the lighting device 108. The code embedded in the light output may be detectable by a light sensor (e.g. a camera or a photodiode) of the portable device 120. This enables a user to point the light sensor of the portable device 120 (e.g. a smartphone, smart glasses, etc.) towards the lighting device 108, whereupon the portable device 120 may provide an indicator (e.g. on a display) to the user that the virtual object 110 is located within the first predetermined proximity 112 of the lighting device 108. The code may be unperceivable for a user. The code may be created by any known principle of embedding a code in light, for example by controlling a time-varying, modulated current to the one or more light sources to produce variations in the light output, by modulating the amplitude and/or the duty-cycle of the light pulses, etc.

The receiver 104 may be further configured to receive a presence signal from a portable device 120. The presence signal may be received from the portable device 120 directly. The presence signal may comprise location information about the physical location of the portable device 120. The physical location of the portable device 120 may, for example, be a GPS location (e.g. a set of coordinates), an (indoor) location relative to an area (e.g. coordinates in a room), etc. Alternatively, the physical locations of one or more portable devices 120 may be stored in a memory accessible by the controller 102/receivable by the receiver 104. The memory may be comprised in a remote server, accessible via a network. The receiver 104 may be arranged for communicating with the portable device 120 and/or the remote server via any wired or wireless communication protocol. Various wired and wireless communication protocols may be used, examples include but are not limited to Ethernet, DMX, DALI, USB, Bluetooth, Wi-Fi, Li-Fi, 3 G, 4 G and/or ZigBee.

Alternatively, the reception of the presence signal may be indicative of the portable device 120 being within the second predetermined proximity 122. The portable device 120 may, for example, communicate the presence signal via a close-range radio frequency protocol (e.g. Bluetooth, ZigBee, NFC, etc.) to the controller 102 (which may be comprised in the lighting device 108), whereupon the processor 106 may determine that the portable device 120 is located within the second predetermined proximity 122.

The processor 106 may be further configured to determine that the portable device 120 is located within a second predetermined proximity 122 of the lighting device 108 based on the presence signal. The presence signal may, for example, comprise a set of coordinates of the physical location of the portable device 120, and the processor 106 may determine a distance between the lighting device 108 and the portable device 120 based on the location (e.g. a set of coordinates of the location of the lighting device 108). If the distance is below a predetermined threshold, the processor 106 may determine that the portable device 120 is located within the second predetermined proximity 122 of the lighting device 108. Alternatively, the location information of the lighting device 108 may be indicative of an area surrounding the lighting device 108, and the processor 106 may determine if the location of the portable device 120 are located inside the area. If the portable device 120 is located inside the area, the processor 106 may determine that the portable device 120 is located within the second predetermined proximity 122 of the lighting device 108.

The second predetermined proximity 122 may be selected based on the intended use of the system 100. The second predetermined proximity 122 may be different from the first predetermined proximity 112, or it may be the same. It may be advantageous if the second predetermined proximity 122 is similar to the first predetermined proximity 112, because this may clarify to the user when he or she enters the area defined by the second predetermined proximity 122, the virtual character 110 must be within the same area. The range/area of the second predetermined proximity 122 may depend on the scale of the system. If, for example, the lighting device is a luminaire which is used in a home setup, the second predetermined proximity 122 may be a distance of for example 5 meters from the lighting device 108, or it may cover the complete room, whereas if the lighting device 108 is an outdoor luminaire, such as a street lamp post, the second predetermined proximity 122 may be a distance of for example 2, 5, 10 or 20 meters from the lighting device 108. It should be noted that these distances are mere examples, and that the skilled person would be able to design many alternatives without departing form the scope of the appended claims.

The processor 106 may be further configured to control the lighting device 108 according to the light setting when the portable device 120 is located within the second predetermined proximity 112 of the lighting device 108. Thus, if the virtual object 110 is located within the first predetermined proximity 112 of the lighting device 108, and the portable device 120 is located within the second predetermined proximity 122, the processor 106 may control the lighting device 108 according to the light setting.

The processor 106 may be further configured to obtain location information about the physical location of the lighting device 108, and to determine the light setting based on a relation between the physical location of the lighting device 108 and the physical location of the virtual object. For instance, the virtual object may be a virtual character that moves in the virtual space, and therewith in the physical space. The processor 106 may control the lighting device 108 when the virtual character is located at (or 'underneath') the lighting device 108 to indicate the presence of the virtual character.

The presence signal may comprise location information about the physical location of the portable device 120 (e.g. a first set of coordinates), and the processor 106 may be further configured to obtain location information about the physical location of the lighting device 108 (e.g. a second set of coordinates). The processor 106 may determine the light setting based on a relation between the physical location of the lighting device 108, the physical location of the portable device 120 and the physical location of the virtual object. For instance, when a virtual object crosses a (virtual) line between the lighting device 108 and the portable device 120, the processor 106 may change the light setting of the lighting device 108 to indicate the virtual object's presence. The processor 106 may, for instance, change the color of the light according to the color of the virtual object. Alternatively, the processor 106 may switch off the lighting device 108 to mimic a shadow of the virtual object. In another example, when the virtual object approaches a user facing the lighting device 108 and operating the portable device 120 from behind, the processor 106 may gradually increase or decrease the brightness of the light setting to indicate the approaching virtual object.

The processor 106 may be further configured to determine the light setting based on a distance between the virtual object 110 and the lighting device 108. The processor 106 may determine the distance based on the coordinates of the physical location of the virtual object 110 and the coordinates of the lighting device 108. The light setting may, for example, be indicative of a distance between the virtual object 110 and the lighting device 108. The processor 106 may for example set the light output of the lighting device 108 to a red light setting when the virtual object 110 is farther away from the lighting device 108, and set the light output of the lighting device 108 to an orange light setting if the virtual object 110 is closer by the lighting device 108. Additionally or alternatively, the processor 106 may be configured to determine a distance between the portable device 120 and the lighting device 108. The processor 106 may be configured to determine the light setting based on the distance between the portable device 120 and the lighting device 108 and based on the distance between the virtual object 110 and the lighting device 108.

The processor 106 may be further configured to determine the location of the portable device 120 relative to the lighting device 108 based on the presence signal, and to determine the light setting based on the location of the virtual object 110 relative to the location of the portable device 120. For instance, the processor 106 may control the lighting device 108 based on a distance between the virtual object 110 and the portable device 120 (the processor 106 may for example control the light output of the lighting device 108 such that the brightness (and/or color) of the light output increases when the distance between the portable device 120 and the virtual object 110 decreases).

The processor 106 may be further configured to determine that a plurality of portable devices 120 are located within the second predetermined proximity 122 of the lighting device 108 based on a plurality of presence signals received from the plurality of portable devices 120. The processor 106 may be further configured to determine the light setting based on a number of portable devices 120 that are located within the second predetermined proximity 122 (the processor 106 may for example control the light output of the lighting device 108 such that the brightness (and/or color) of the light output increases when the number of portable devices 120 that are located within the second predetermined proximity 122 increases).

The receiver 104 may be further configured to receive location information representative of a plurality of physical locations of a plurality of respective virtual objects 110 relative to the lighting device 108. The processor 106 may be further configured to determine the light setting based on a number of virtual objects that are within the first predetermined proximity 112 of the lighting device 108. For instance, the processor 106 may set the light output of the lighting device 108 to a light setting having a high brightness when multiple virtual objects 110 are located within the first predetermined proximity 112 of the lighting device 108, and set the light output of the lighting device 108 to a light setting having a low brightness if less (e.g. a few, only one, or none) virtual objects are located within the first predetermined proximity 112 of the lighting device 108.

The processor 106 may be further configured to determine a light setting for the lighting device 108 based on a property of the virtual object 110. The property may, for example, be a color of the virtual object 110, and the processor 106 may be configured to control the lighting device 108 according to a light setting having a color (and/or brightness) that corresponds to the color of the virtual object 110. Additionally or alternatively, the property may be a type (e.g. an animate virtual object, an inanimate virtual object, etc.) of the virtual object 110, and the processor 106 may be configured to control the lighting device 108 according to a light setting having a color (and/or brightness) that corresponds to the type of the virtual object 110. Additionally or alternatively, the property may be an orientation of the virtual object 110, and the processor 106 may be configured to control the lighting device 108 according to a light setting having a brightness (and/or a color) that corresponds to the orientation of the virtual object 110 (if the virtual object is moving towards the lighting device, the brightness (and/or color) may be different then when the virtual object 110 is moving away from the lighting device 108). Additionally or alternatively, the property may be a remaining lifetime of the virtual object 110, and the processor 106 may be configured to control the lighting device 108 according to a light setting having a brightness (and/or a color) that corresponds to the remaining lifetime of the virtual object 110 (e.g. how long the virtual object 110 will be present). Additionally or alternatively, the property may be a state of the virtual object 110, and the processor 106 may be configured to control the lighting device 108 according to a light setting having a color and/or brightness that corresponds to the state (e.g. a moving virtual object, a stationary virtual object, an interactive virtual object, a non-interactive virtual object, etc.) of the virtual object 110 (e.g. presence of virtual object which allows user interactivity may be indicated with a light setting different from presence of a virtual object that does not user interactivity). It should be noted that the above-mentioned examples of properties of the virtual object 110 are mere examples, and that the skilled person is able to determine a light setting based on different properties without departing from the scope of the appended claims.

The lighting device 108 may be any type of lighting device 108 arranged for receiving lighting control commands from the processor 106. The lighting device 108 may for example comprise one or more LED light sources, which may have be arranged for emitting light under different wavelengths. The lighting device 108 may be arranged for providing general lighting, task lighting, ambient lighting, atmosphere lighting, accent lighting, indoor lighting, outdoor lighting, etc. The lighting device 108 may be installed in a luminaire or in a lighting fixture, or the lighting device 108 may be a portable lighting device (e.g. a hand-sized device, such as an LED cube, an LED sphere, an object/animal shaped lighting device, etc.).

Figure 2:
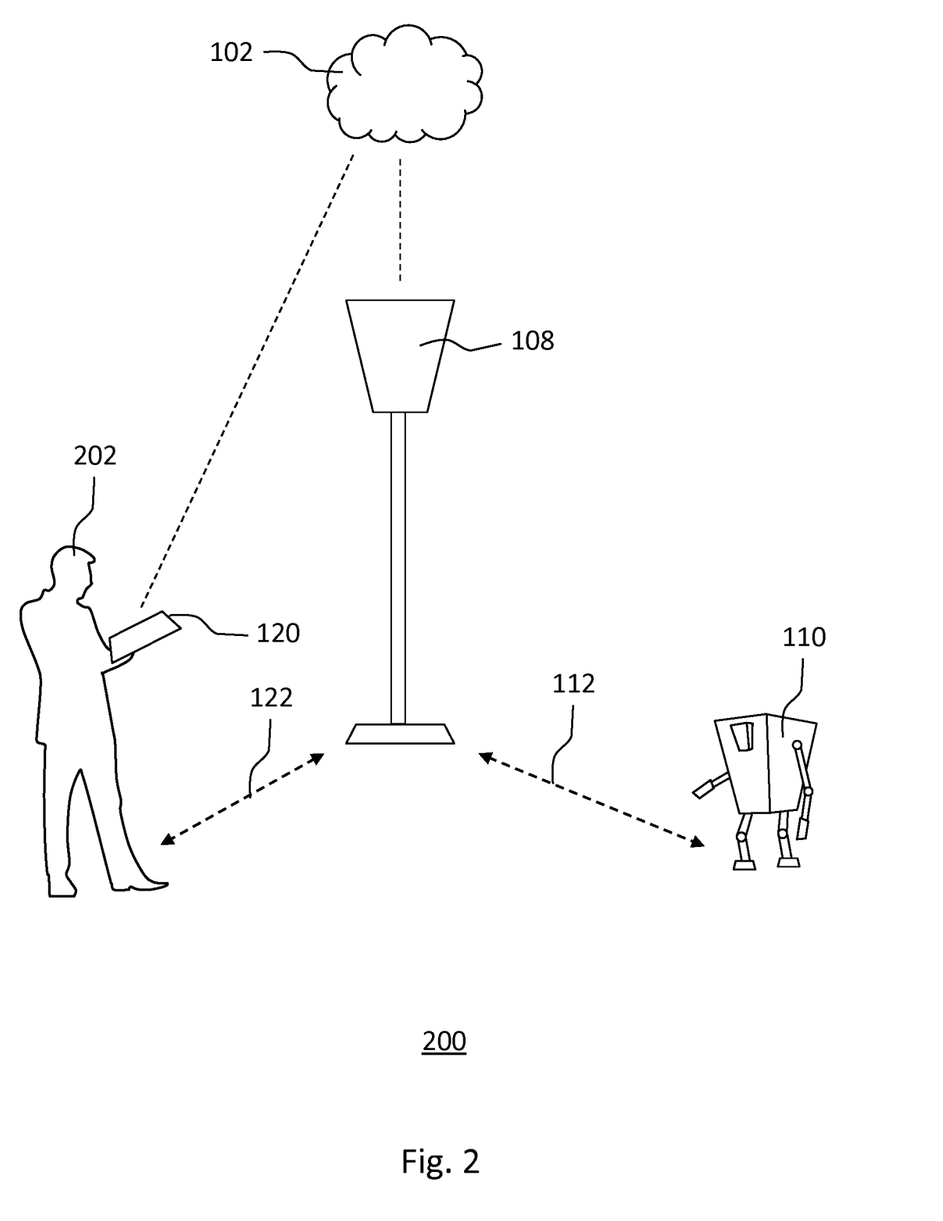
FIG. 2 shows schematically an embodiment of a lighting system according to the invention for indicating a presence of a virtual character via a lighting device.

FIG. 2 shows schematically an embodiment of a lighting system 200 according to the invention for indicating a presence of a virtual character 110 via a lighting device 180. The virtual character 110 may move between multiple virtual locations corresponding to physical locations. The controller 102, which in this example may be located in a remote server, may be continuously updated on the location of the virtual object 110. The receiver 104 (not shown in FIG. 2) may receive the location information at specific moments in time. Additionally or alternatively, the location information may comprise information about a trajectory (a sequence of virtual locations corresponding to physical locations) of the virtual object 110 over time relative to the lighting device 108. This enables the processor to determine the location of a moving virtual object 110. This further enables a user 202 to see whether the moving virtual object 110 is located within the first predetermined proximity 112 of the lighting device 110.

Figure 3:
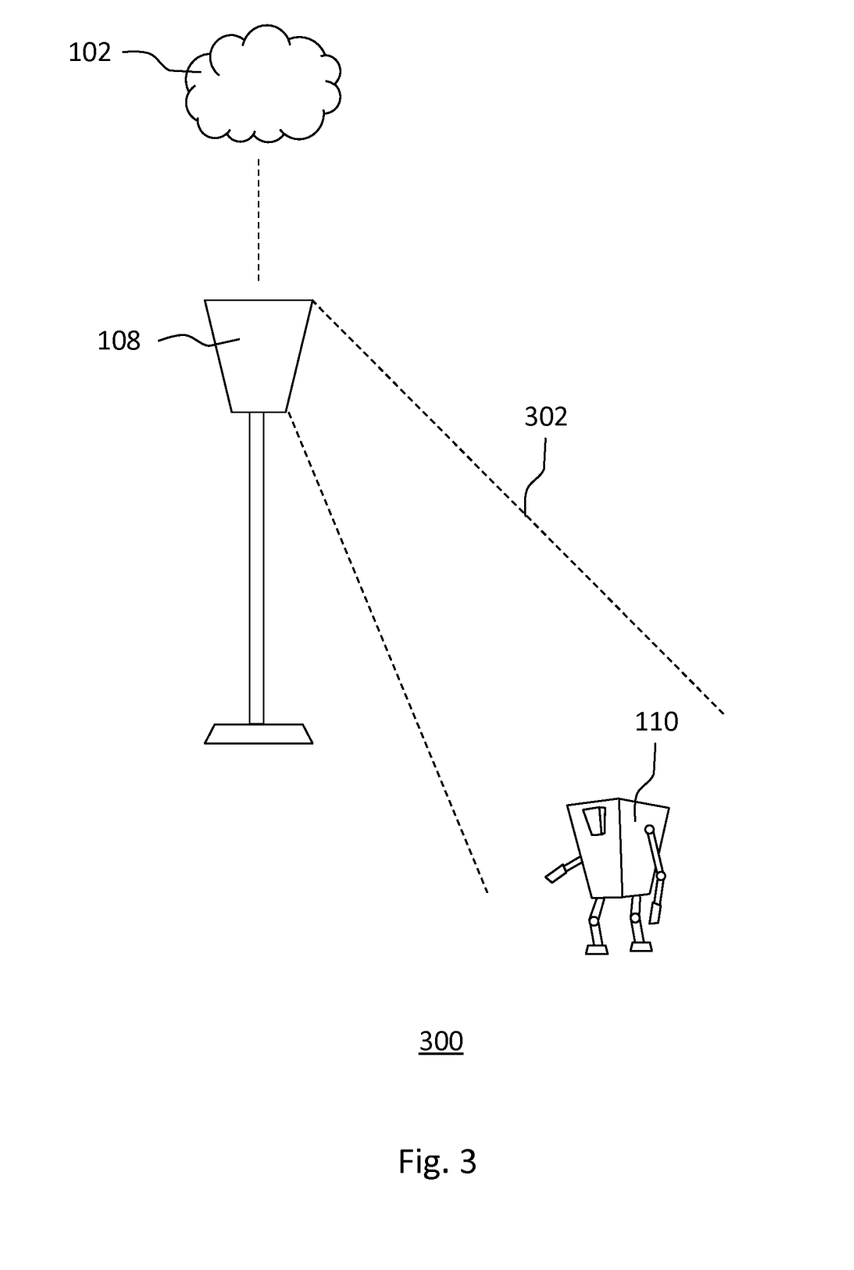
FIG. 3 shows schematically an embodiment of a lighting system according to the invention for indicating a location of a virtual object with a beam of light of a lighting device.

FIG. 3 shows schematically an embodiment of a lighting system 300 according to the invention for indicating a location of a virtual object 110 with a beam of light 302 of a lighting device 108. The processor 106 (not shown in FIG. 3) may be configured to control a direction of a beam of light 302 of the lighting device 108, and to direct the beam of light 302 towards the physical location of the virtual object 110. The receiver 104 (not shown in FIG. 3) may receive the location information representative of the physical location of the virtual object 110, and the processor may determine the location of the virtual object 110 relative to the lighting device 108. For instance, the receiver may receive coordinates of the location of the virtual object 110, and the processor may have access to the physical location (e.g. coordinates) and orientation of the lighting device 108, which enables the processor to determine the location of the virtual object 110 relative to the lighting device 108. The lighting device 108 may further comprise adjustable optics for adjusting the shape of the beam. The processor (not shown) may be configured to control the adjustable optics, and therewith the direction of the beam of light 302 of the lighting device 108. Examples of adjustable optics include but are not limited to lenses, mirrors, reflectors, shades or other light distribution elements, which may be mechanically moveable. This allows adjustment of the beam shape of the light emission of the lighting device 108, even if the lighting device 108 comprises only one light source. Additionally or alternatively, the lighting device 108 may comprise a plurality of light sources. The light sources may be arranged in an array (and, optionally, have different orientations) such that they may illuminate different areas surrounding the lighting device 108. The processor may be configured to control the plurality of light sources such that they only illuminate an area where the virtual object is located. This allows for non-mechanical (digital) control of the beam of light 302, which is advantageous because it may remove the need for mechanically moveable optics. This further enables the processor to illuminate a plurality of areas when a plurality of virtual objects are located within the first predetermined proximity 112 of the lighting device 108. Additionally, when the virtual character 110 moves between multiple physical locations, the processor may continuously control the direction of the beam of light 302 of the lighting device 108, such that a user is able to see the exact location of the virtual object 110 relative to the lighting device 108.

The processor may be further configured to determine the size and/or the shape of the beam of light 302 based on a property of the virtual object. The processor may, for example, determine the size of the beam of light 302 based on the size of the virtual object 110 (e.g. by illuminating a physical location of a larger virtual object 110 with a larger beam size). Additionally or alternatively, the processor may, for example, determine the size of the beam of light 302 based on the speed of a moving virtual object 110. Additionally or alternatively, the processor may, for example, determine the size of the beam of light 302 based on the remaining lifetime (e.g. how long the virtual object will be present) of a virtual object 110 (e.g. by decreasing the size of the beam of light 302 as the lifetime decreases).

Figure 4:
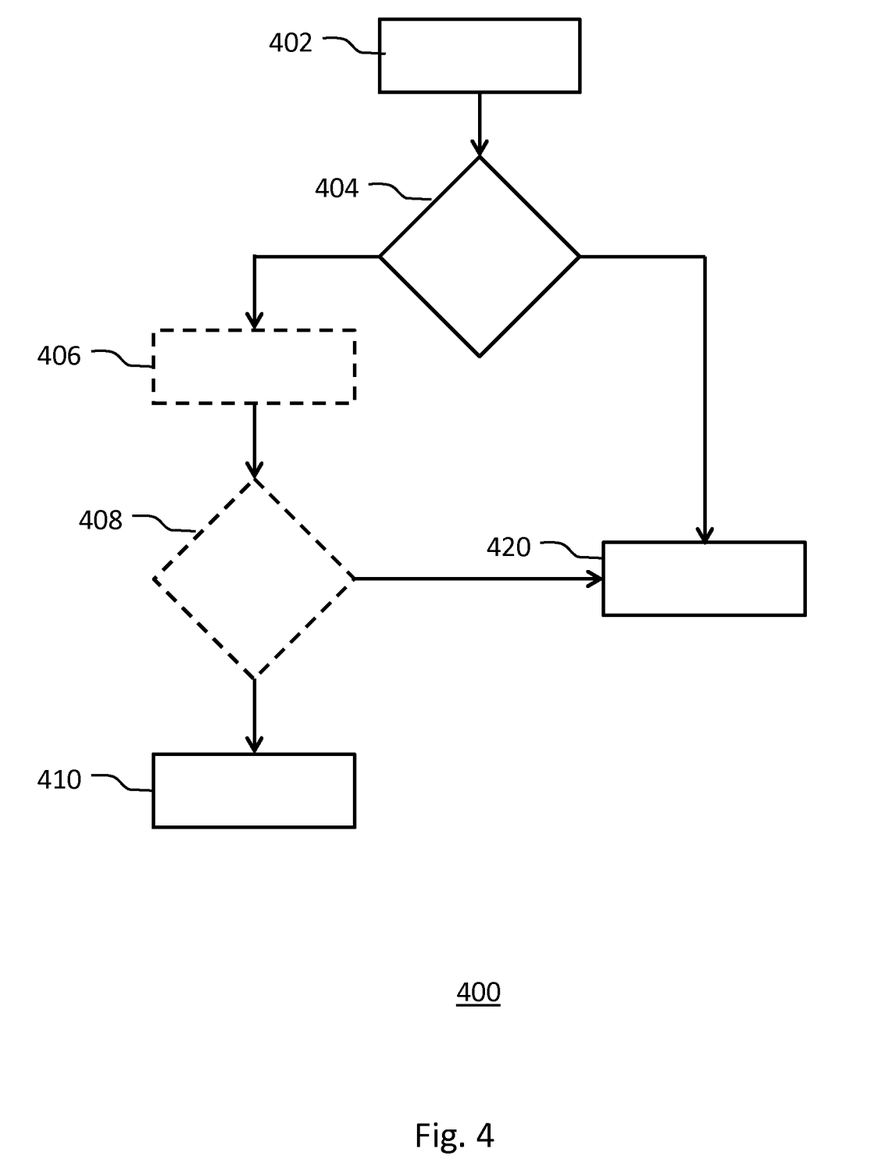
FIG. 4 shows schematically a method according to the invention for indicating a presence of a virtual object via a lighting device.

FIG. 4 shows schematically a method 400 according to the invention for indicating a presence of a virtual object 110 via a lighting device 108. The virtual object 110 has a virtual location corresponding to a physical location. The method 400 comprises receiving 402 location information representative of the physical location of the virtual object 110 relative to the lighting device 108. The method 400 further comprises determining 404 if the virtual object 110 is located within a first predetermined proximity 112 of the lighting device 108 based on the location information. If the virtual object 110 is located within the first predetermined proximity 112 of the lighting device 108, the method 400 further comprises controlling 410 the lighting device 108 according to a light setting. If the virtual object 110 is not located within the first predetermined proximity 112 of the lighting device 108, the method 400 may comprise controlling 420 the lighting device 108 such that the light output of the lighting device 108 does not change (e.g. keeping the light turned off/not changing the light setting of the lighting device 108).

Additionally, the method 400 may comprise the steps of receiving 406 a presence signal from a portable device 120, and determining 408 that the portable device 120 is located within a second predetermined proximity 122 of the lighting device 108 based on the presence signal. If the portable device 120 is located within the second predetermined proximity 122 of the lighting device 108, the method 400 further comprises controlling 410 the lighting device 108 according to the light setting. If the portable device 120 is not located within the second predetermined proximity 112 of the lighting device 108, the method 400 may comprise controlling 420 the lighting device 108 such that the light output of the lighting device does not change (e.g. keeping the light turned off/not changing the light setting of the lighting device 108). It should be noted that the steps of the method 400 need not necessarily occur in the order as illustrated in FIG. 4 (for example, steps 402 and 404 may occur after steps 406 and 408).

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. A controller for indicating a presence of a virtual object via a lighting device for providing general illumination, the virtual object having a virtual location corresponding to a physical location, the controller comprising:
   a receiver configured to receive location information representative of the physical location of the virtual object relative to the lighting device, and configured to receive a presence signal from a portable device configured to display the virtual object,
   a processor configured to determine if the virtual object is located within a first predetermined proximity of the lighting device based on the location information, to determine that the portable device is located within a second predetermined proximity of the lighting device based on the presence signal, and to control the lighting device according to a light setting when the virtual object is located within the first predetermined proximity of the lighting device and when the portable device is located within the second predetermined proximity of the lighting device,
   wherein the processor is further configured to control a direction of a beam of light of the lighting device, and to direct the beam of light towards the physical location of the virtual object.

2. The controller of claim 1, wherein the controller is further configured to embed a code in a light output of the lighting device, wherein the code comprises a message representative of that the virtual object is located within the first predetermined proximity of the lighting device.

3. The controller of claim 1, wherein the processor is configured to determine a distance between the virtual object and the lighting device based on the location information.

4. The controller of claim 3, wherein the processor is configured to determine the light setting based on the distance between the virtual object and the lighting device.

5. The controller of claim 1, wherein the receiver is configured to receive location information representative of a plurality of physical locations of a plurality of virtual objects relative to the lighting device, and wherein the processor is configured to determine the light setting based on a number of virtual object that are within the first predetermined proximity of the lighting device.

6. The controller of claim 1, wherein processor is further configured to determine the light setting based on a property of the virtual object.

7. The controller of claim 6, wherein the property comprises at least one of:
   a color of the virtual object,
   a type of the virtual object,
   an orientation of the virtual object,
   a remaining lifetime of the virtual object, and
   a state of the virtual object.

8. The controller of claim 1, wherein the controller is comprised in the lighting device, and wherein the receiver comprises a network module configured to access the location information via a network.

9. The controller of claim 1, wherein the controller is located remote from the lighting device, and wherein the controller comprises a network module configured to transmit lighting control commands to the lighting device to control the lighting device according to the light setting.

10. The controller of claim 1, wherein the processor is further configured to obtain location information about the physical location of the lighting device, and to determine the light setting based on a relation between the physical location of the lighting device and the physical location of the virtual object.

11. A lighting system for indicating a presence of a virtual object via a lighting device, the system comprising:
    the controller of claim 1, and
    one or more lighting devices configured to receive lighting control commands from the controller.

12. A method of indicating a presence of a virtual object via a lighting device for providing general illumination, the virtual object having a virtual location corresponding to a physical location, the method comprising:
    receiving location information representative of the physical location of the virtual object relative to the lighting device,
    receiving a presence signal from a portable device configured to display the virtual object,
    determining if the virtual object is located within a first predetermined proximity of the lighting device based on the location information,
    determining that the portable device is located within a second predetermined proximity of the lighting device based on the presence signal, controlling the lighting device according to a light setting when the virtual object is located within the first predetermined proximity of the lighting device and when the portable device is located within the second predetermined proximity of the lighting device, and controlling a direction of a beam of light of the lighting device and directing the beam of light towards the physical location of the virtual object.

13. The method of claim 12, wherein the virtual object moves between multiple virtual locations corresponding to physical locations.

14. A non-transitory computer readable medium comprising computer program product for a computing device, the computer program product comprising computer program code to perform the method claim 12 when the computer program product is run on a processing unit of the computing device.

\* \* \* \* \*